United States Patent [19]

Crean

[11] Patent Number: 4,628,323
[45] Date of Patent: Dec. 9, 1986

[54] SIMPLIFIED POLAR MOUNT FOR SATELLITE TRACKING ANTENNA

[76] Inventor: Robert F. Crean, P.O. Box 1431, White River Junction, Vt. 05091

[21] Appl. No.: 547,613

[22] Filed: Nov. 1, 1983

[51] Int. Cl.⁴ ............................................. H01Q 3/08
[52] U.S. Cl. .................................... 343/765; 343/882
[58] Field of Search ............... 343/880, 882, 840, 765, 343/766, 757–760, 894; 248/124, 156, 178, 179

[56] References Cited

U.S. PATENT DOCUMENTS

| | | | |
|---|---|---|---|
| 3,407,404 | 10/1968 | Cook et al. | 343/765 |
| 3,510,877 | 5/1970 | Turriere | 343/882 |
| 4,126,865 | 11/1978 | Longhurst et al. | 343/766 |
| 4,232,320 | 11/1980 | Savalle, Jr. | 343/882 |
| 4,475,110 | 10/1984 | Hutchins | 343/882 |

FOREIGN PATENT DOCUMENTS 57-72402  5/1982  Japan .................................. 343/882

OTHER PUBLICATIONS

*Electronics*, "Kennedy Cycloconic Mounting", Jul. 15, 1960, vol. 33, No. 29, p. 19.

*Primary Examiner*—Eli Lieberman
*Assistant Examiner*—Michael C. Wimer
*Attorney, Agent, or Firm*—Sughrue, Mion, Zinn, Macpeak & Seas

[57] ABSTRACT

A stove pipe elbow connection formed by using two pipes cut at 45 degrees angles and connected by flanges rotatable on each other provides elevation adjustment for a dish antenna between zero degrees and 90 degrees, with the base pipe projecting upwardly perpendicular to the earth surface. The base pipe is rotated about its axis until the flange connected projecting pipe points north and that assembly fixed. A two tube assembly having an inner tube slid over the angled projecting pipe and an outer tube fixed to the inner tube but having its axis at an angle of approximately 12 degrees thereto for correcting for maximum declination supports the antenna which rotates about the axis of the inclined outer pipe to adjust for declination. The antenna is bolted in place after the proper declination angle is reached and further rotation of the antenna about the axis of the pipe projecting causes the antenna to sweep across all of the satellites in the geosynchronous orbit sector bearing such satellites.

13 Claims, 9 Drawing Figures

SIMPLIFIED POLAR MOUNT FOR SATELLITE TRACKING ANTENNA

FIELD OF THE INVENTION

This invention relates to polar mounts for dish type microwave signal satellite antennas and, more particularly, to a simplified polar mount utilizing a series of tubes to permit ready adjustment for azimuth, elevation and declination necessary to properly align the dish antenna axis with the sector of the geosynchronous satellite orbit in the plane of the earth's equator.

BACKGROUND OF THE INVENTION

In microwave communication, parabolic antennas (dishes) must be aimed with accuracy at the source of the signals. In ground systems (such as the systems the telephone companies employ to get the telephone calls transmitted long distance), the antennas are mounted on towers and aimed while technicians listen to the signals for their strongest point. When the strongest signal is heard, the antenna is bolted in place.

When satellites began carrying microwave transmitters and repeaters, a new problem emerged; how to follow the satellites with the dishes to keep the signals strong. The first satellites used were not in geosynchronous orbit, that is, they moved about a point on the surface of the earth relative to that point. As such, the first dish antennas were simultaneously motorized in more than one direction to find and track the satellite once the satellite was located. Such systems were very expensive. Since those days, communication satellites have been placed exactly 22,300 miles above the equator and in the plane passing through the equator where they revolve around the earth exactly once every twenty-four hours. Predictively, since the earth revolves identically, the net result is that the satellite hovers over the same spot on the earth at all times.

This simplifies satellite communications since now all one had to do is to simply find the satellite and fix the dish in place pointed at the satellite. The conventional method of moving the dishes to track non-geosynchronous satellites is known as elevation-azimuth (EL-AZ) tracking. As such, there are two axes of rotation. The first, or lowest to the ground, is usually the azimuth motion, which is a direction relative to the points of the compass, i.e. north, east, south, etc. By rotation of the antenna about that axis, just as a lazy susan on the dinner table moves about an axis perpendicular to the table top, any direction on the compass may be pointed to. Then, atop this rotating platform is normally another axis which moves up and down, that is, it goes from horizon to zenith (directly overhead). If the satellite are behind your antenna (past the zenith), one could rotate the first axis 180 degrees and then adjust the elevationa portion of the mount until the satellite was found.

The problem with this kind of mount for use with geosynchronous satellites is that to move from one satellite in the belt to the next, for each shifting from one satellite to another, the antenna must be rotated in the two axes. This makes for a complex and costly control mechanism because one must know how much to move the antenna in both directions. This may be fine for major TV stations or networks that use large earth stations that cost $30,000 to $40,000, but for the small system user (home television), a simpler method was needed.

To meet this need, particularly for the home television reception, polar mounts were designed. The polar mount has two axes of rotation, but they are oriented and spaced differently. In the polar mount, the first axis is the elevation axis. The carriage which holds the other axis is rotated about the first axis (elevation axis) until the second axis points to true north (parallel to a line drawn through the earth's poles). Assuming that such polar mounts were utilized at the equator, i.e. in the plane of the geosynchronous satellite, all that is necessary is to rotate the antenna about a second axis to find all of the satellites in geosynchronous orbit (all those that are visible from our position on the earth). In this situation, the antenna would travel in an arc directly overhead from east to west or west to east.

The problem occurs when the position of the antenna is shifted, either north or south of the equator. Things get much more complicated. If one rotates the carriage as before so that the second axis is pointing to true north, the antenna (axis) would normally point at right angles to this second axis out into space but would not find any satellites because it would be following an arc in space exactly as many miles as we are from the plane of the equator. It should be remembered that this distance would be measured directly into the earth at some angles to reach the equatorial plane passing through the earth proper. At the north pole, this distance would be nearly 4,000 miles or half the diameter of the earth.

This requires, of necessity, that one make a declination correction which functions to point the antenna southward somewhat (northward in the southern hemisphere) to intersect the circle of satellites 22,300 miles in space, opposite the equator. Once this is accomplished, to find any satellites in the sector of the circle bearing the satellites at that distance about the center of the earth and within the equatorial plane, one needs to move the antenna about only one axis. As may be appreciated, a polar mount is therefore simpler and less expensive than an EL-AZ mount described initially. In fact, this is the way most home television satellite antennas are mounted and pointed. Once proper elevation control and declination control are achieved with respect to the polar mount, these controls are never changed and the antenna is moved solely in azimuth to sweep from one satellite to the other.

It is therefore a primary object of the present invention to provide an improved low cost simplified polar mount utilizing a series of tubes to provide for orientation of the antenna support relative to the polar axis, to provide the proper declination adjustments and to permit the sweep of the geosynchronous satellite sector to a selected satellite within that sector.

SUMMARY OF THE INVENTION

The present invention is directed to a polar mount apparatus for aligning a microwave directional antenna axis with a given satellite of a series of satellites with the earth's equatorial geosynchronous orbit track section, the apparatus comprising a directional antenna, a cylindrical base member mounted for rotation about a vertical axis on the earth and being diagonally cut at its upper end, a cylindrical latitude adjustment member cut at one end at a diagonal matching that of the base member, means for rotatably mounting the cut ends of the members end-to-end such that the members rotate in the plane of the cut between axial in line position and a position with the respective axes at 90 degrees to each other, means for mounting the antenna to the latitude adjustment member for rotation about the axis of the latitude adjustment member, and means for fixedly adjusting the inclination of the axis of the antenna relative to the axis of the latitude adjustment member to the degree of declination necessary to compensate for the location of the polar mount apparatus in the earth from the equatorial plane; whereby, aligning is achieved by a series of steps comprising rotation of the latitude adjustment member on the base member to a position corresponding to the earth's latitude location and locking of the members together, rotating the cylindrical base member to align the axis of the latitude adjustment member to a position where the latitude adjustment member points to the north pole, and fixing it thereat, adjusting the position of the antenna on the latitude adjustment member to compensate for the declination angle relative to the equatorial plane at that latitude, and rotating the antenna about the axis of the latitude adjustment member until the directive antenna points to the given satellite within the sector. The cylindrical base member and cylindrical latitude adjustment member may comprise hollow tubes terminating in radially outwardly directed flanges at 45 degrees to the axis of the members with means carried by at least one of the flanges for selectively locking the flanges together after rotation of one member with respect to the other to the proper angular position for the latitude of the earth's location for the apparatus. Further, an inner tube is slidably mounted on the outside of the cylindrical latitude adjustment member for rotation about the axis of the latitude adjustment member. An outer tube is fixedly mounted to the inner tube with their axes defining therebetween an acute angle equal to the maximum declination adjustment angle for the polar mount apparatus. The antenna may be mounted on the outer tube for rotation about the periphery of the outer tube and means for adjustably fixing the antenna to the outer tube at variable angular positions with respect to the tube to adjust the antenna for the declination angle at the latitude at which the polar mount apparatus is positioned. U-bolts surrounding the outer tube function to adjustably fix the antenna to the outer tube at an angular position with respect to the outer tube to permit the antenna to be rotated about the axis of the outer tube to provide for the declination adjustment. The antenna may comprise a dish antenna with a planar base member fixedly mounted to the outside of the dish antenna at its apex with the paired U-bolts or straps surrounding the outer tube at spaced locations terminating in threaded ends projecting through the base member and with nuts carried by the threaded ends of the U-bolts, whereby loosening the nuts permits the antenna, the base member and the U-bolts to be rotated about the axis of the outer tube to permit the adjustment for declination. The inner tube may have an inner diameter slightly larger than the outer diameter of the cylindrical latitude adjustment member for rotation thereabout with the outer tube being of a somewhat larger diameter than the inner tube and with the outer tube being welded to the inner tube at least at one end thereof to fix the maximum declination adjustment angle between the tubes. A plurality of circumferentially spaced longitudinally extending slots may be provided within one end of the inner tube with a hose clamp surrounding the inner tube at the location of the slot such that closing down of the hose clamp frictionally locks the inner tube onto the cylindrical latitude adjustment member at a given angular position such that after the antenna has been rotated about the axis of the latitude adjustment member by rotation of the inner tube, the antenna points to a given satellite and remains aligned therewith. A vertically upstanding fixedly mounted post may receive the end of the cylindrical base member remote from the flanged end and the cylindrical base member may comprise one or more set screw to contact the periphery of the post internally thereof to lock the cylindrical base member at a position where the cylindrical latitude adjustment member points to the north pole of the earth.

Alternatively, the declination angle adjustment assembly may form an internal cylindrical surface sized to and slidably, rotatably receiving the cylindrical latitude adjustment member while further forming an external cylindrical surface whose axis is at an acute angle to the axis of the internal cylindrical surface corresponding to the maximum declination adjustment angle needed for the latitude position of the antenna polar mount. Such declination angle adjustment assembly may comprise a unitary cylindrical member of solid material such as light weight plastic foam with the internal cylindrical surface defined by an internal bore inclined to the axis of the cylindrical member. In a further embodiment, the declination angle adjustment assembly may be defined by an outer tube and a pair of short length inner tubes axially aligned with each other, and being welded to the outer tube at respective ends such that the common axis of the short length tube is inclined relative to the outer tube within which the inner tubes are mounted. In a further modification, the declination angle adjustment assembly may be comprised of an inner tube slidably, rotatably receiving the cylindrical latitude adjustment member and being sized thereto, and wherein a pair of larger diameter, short length outer tubes are welded to respective ends of the inner tube, the short length tubes being aligned axially but having their axis inclined relative to the axis of the inner tube corresponding to the maximum declination adjustment angle required for practical positioning of the polar mount.

In yet a further embodiment, the declination angle adjustment assembly may comprise an upper cylindrical member having its lower end cut at a diagonal angle relative to the perpendicular to its axis corresponding to the maximum declination angle to which the antenna must be adjusted, and wherein that end is mounted to the end of the cylindrical latitude adjustment member for rotation thereon with that end of the cylindrical latitude adjustment member being cut at right angles to its axis. The dish antenna near its apex is mounted by paired U-bolts or straps surrounding the upper cylindrical member such that the antenna may be rotated about the periphery of the upper cylindrical member to adjust the declination of the antenna to meet that requirement at the latitude of the polar mount. Means are provided for locking the upper member relative to the latitude adjustment member after rotation to a position where the antenna directional axis is aligned with the given satellite.

DESCRIPTION OF THE PREFERRED EMBODIMENTS

Figures 1, 3, 4:
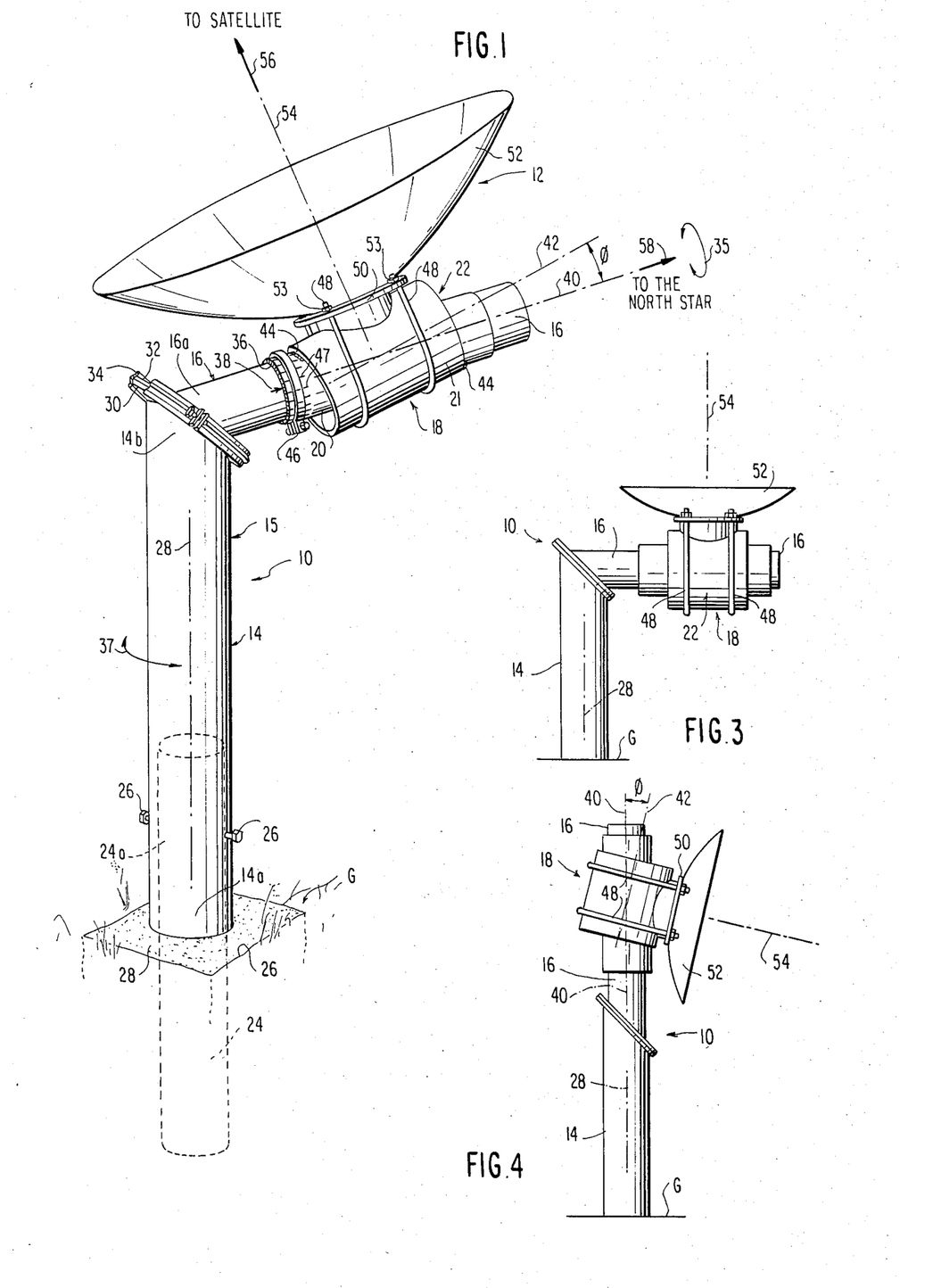
FIG. 1 is a perspective view of the microwave polar antenna mount forming a first embodiment of the present invention and the antenna mounted thereby.
FIG. 3 is a side elevational view of the polar mount and antenna shown in FIG. 1, under conditions where the mount and antenna are located near the earth's equator.
FIG. 4 is a side elevational view of the polar mount and antenna of FIGS. 1 and 3 with the antenna positioned near the earth's north pole.

Referring first to FIG. 1, there is illustrated a microwave antenna polar mount indicated generally at 10 forming a first embodiment of the present invention. The mount 10 functions to support a dish type microwave antenna indicated generally at 12. With respect to the polar mount 10, it is composed principally of a base pipe or column 14, a latitude adjustment or projecting pipe 16, and a declination angle assembly 18. Declination adjustment angle assembly 18, in turn, is comprised of two short pipes or tube sections indicated generally at 20 and 21 which are welded together to form a declination head 22 and whose intersecting axes are slightly inclined to each other for reasons to be described hereinafter.

A major aspect of the present invention resides in the simplified latitude adjustment or base assembly 15 which is made up solely by pipes 14 and 16. In this respect, base pipe 14 is mounted perpendicular to the plane of the earth as defined by ground G, for rotation about axis 28 of pipe 14. To achieve this end, pipe 14 rotates about a vertical post 24 which post is set in hole 26, hole 26 being filled except for post 24 by concrete 28. Alternatively, post 24 may be roof mounted or otherwise. Portion 24a of the post 24 projects above the ground. Post 24 is of a diameter which is slightly less than the inside diameter of pipe 14 which comprises a hollow steel pipe and whose lower end 14a receives the projecting post portion 24a. A plurality of set screws as at 26 are mounted to the outside of pipe or column 14 and engage post portion 24a to fixedly lock the column or base pipe 14 after its rotation to place the latitude adjustment pipe 16 pointed towards the North Star (aligned with the earth's north/south axis). The pipes 14 and 16 terminate in ends as at 14b and 16a, respectively, which are coupled together. The ends are cut to matching 45 or other degree angles. The angle could be any angle equal to the lowest latitude at which the unit will be used. To permit coupling to be achieved and to permit adjustable rotation of the latitude adjustment pipe 16 relative to the base pipe or column 14 at the flange interface between the 45 degree angle cuts, both of the pipes are provided with mating flanges. Pipe 14 terminates in a lower flange 30, while pipe 16 terminates in matching flange 32. The flange may be welded to the pipe ends at the 45 degree cuts. If the angles are 45 degrees, then the two pipes can intersect each other at any angle between zero degrees and 90 degrees simply by rotating the two flanges 30 and 32 relative to each other. This provides the adjustment for elevation, which varies with latitude, and has to be performed only once to make a latitude adjustment depending upon the distance from the equator in the direction of the north pole (or south pole), unless the antenna location is moved. For illustrative purposes, a V-band clamp 34 is employed to clamp the two flanges in place, once an angular rotation is made of latitude adjustment pipe 16 relative to the base pipe or column 14 as indicated by arrow 35 about axis 40 of the latitude adjustment pipe 16. Under all conditions, the base pipe 14 is limited to rotatation about a vertical axis 28, that is, one which is perpendicular to the earth's surface or ground G.

Once the adjustment is made for latitude by rotation of projecting pipe 16 about its axis 40, as evidenced by arrow 35, then the base pipe or column 14 is rotated about its axis 28 in accordance with arrow 37 until the projecting pipe 16 points to the north (North Star) as evidenced by arrow 58. This can be accomplished by utilizing a compass (correcting for magnetic variation) or using the sun at its meridian passage. An approximation, of course, is pointing the axis of the pipe in the direction of the North Star. Once this is achieved, the base assembly 15 comprised of pipes 14 and 16 remain fixed. Obviously, rather than being placed in the ground, the assembly 15 may be placed on a roof, etc., but oriented in the manner illustrated in FIG. 1.

Turning next to the declination adjustment angle assembly 18, this is a second important aspect of the present invention and component of the polar mount. This assembly comprises, as mentioned previously, short length pipes or tubes 20 and 21 defining declination head 22. The outside, larger diameter pipe or tube 21 is welded as at 44, to the smaller diameter inner pipe or tube 20 (or both pipes 20 and 21 may be cast as a unit). The smaller diameter pipe 20 whose inner diameter is slightly larger than the outside diameter of the latitude adjustment pipe 16 is slid onto that pipe and, as such, will rotate the antenna 12 from horizon to horizon about the azimuth axis. Such rotation coincides to the type of rotation previously described for pipe 16 at arrow 35, since the axes for pipes 20 and 16 are coincidental.

This leaves only a correction for declination. This is achieved in the simplified and effective manner by adjustably mounting the antenna 12 to the outer tube or pipe 21 of assembly 18. As may be appreciated, the axis of the inner tube 20 is coincident with that of pipe 16 and as indicated at 40, while the axis 42 of the outer pipe 21 is at some angle with respect thereto. Axis 42 is at an angle $\phi$ which is equal to approximately 9 (nine) degrees, the maximum declination experienced by such polar mounts and occuring in the vicinity of the earth's north or south poles.

The simplified adjustable coupling between the dish 52 of antenna 12 and the declination adjustment angle assembly 18 takes the form of a base fixture or plate 50 mounted to the dish 52 at its apex, on the back side thereof, and a pair of U-bolts or straps 48 which encircle the outer tube 21 of the declination adjustment angle assembly 18 and connect at the end to base fixture or plate 50. By loosening the U-bolts or straps 48, the antenna 12 may be rotated about the axis of the outer tube 21 which bears the antenna thereby causing the antenna 12 to point in a direction relative to the axis of pipe 16 which is pointing towards the north, bearing from 90 degrees to 99 degrees, the U-bolts 48 have threaded ends passing through holes within base support member 50 which bear nuts as at 53 so that once the nuts 53 are loosened, the dish antenna 12 is rotated to the desired position on tube 21 and the nuts 53 are reversely rotated to lock down the U-bolts 48 and clamp the antenna 12 securely to the declination adjustment angle assembly 18. That is, the directional axis 54 of the satellite dish 52 points anywhere from 90 degrees to 102 degrees during rotation of the dish 52 about axis 40 of pipe 16 (pointing to the north). As may be appreciated, one could rotate the antenna 12 so that the angle reached 81 degrees, but this would never be used, because the antenna then would be pointing away from the equator and not towards it, as shown in FIG. 1.

Once the proper declination is found, and there is a unique declination adjustment angle for each latitude, the antenna 12 is bolted in place on tube 21 whose axis 42 is inclined with respect to the common axis 40 for both pipe 16 and the inner tube or pipe 20. Now, just as before, the antenna 12 can be rotated about the axis 40 of pipe 16 to pick up all of the satellites within the sector bearing satellite of the circle constituting the geosynchronous orbit, for the satellites 22,300 miles in space and in the plane of the equator. In the illustrated embodiment, a hose clamp 46 is employed to lock the inner tube 20 at a predetermined position on the latitude adjustment pipe 16 once the antenna axis 54 is aligned with a given satellite within the sector. Inner tube 20, at one end thereof, may be slit at 47 to provide resiliency to the tube 20. The slits define fingers which flex allowing them to clamp tightly against pipe 16. A calibration scale 36 on the end of tube 20 cooperates with reference arrow 38.

In a more sophisticated version, a motor (not shown) fixedly mounted to the latitude adjustment pipe 16 and having a pinion carried by the motor shaft and in mesh with a rack about the outer periphery of inner pipe 20 may function to effect drive rotation of the declination adjustment angle assembly 18, i.e. tube or pipe 20 about pipe 16 to sweep the antenna from one satellite to the other.

Figure 2:
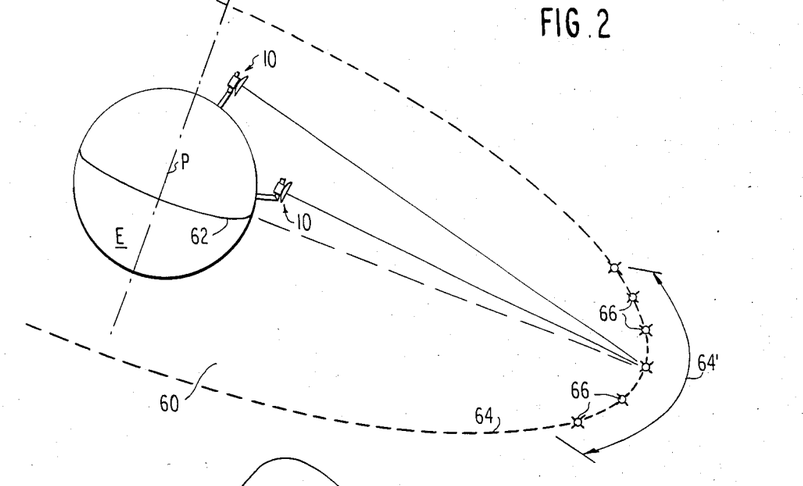
FIG. 2 is a schematic representation of the problem at hand in the utilization of the polar mount of FIG. 1 and its orientation near the equator and near the north pole, respectively.

The effectiveness, operation and orientation of the polar mount and its antenna may be further appreciated by reference to FIGS. 2, 3 and 4. In FIG. 2, the earth E is shown as having a polar axis P which is oriented in the direction of the North Star as per arrow 58. In the earth's equatorial plane as at 60, passing through the equator 62 and at a distance of 22,300 miles from the equator, the geostationary orbit 64 enables the satellites 66 to maintain themselves at the fixed distance from the earth, rotating at a speed conforming to the rotation of the earth about the polar axis P and maintaining fixed distances between the satellite 66 within sector 64'. The declination angle is the "down-look" of the antenna to the equatorial plane which declination is zero in the equatorial plane 60 and at a maximum (9 degrees) in the vicinity of the north pole (or south pole). For the polar mounts 10 at each of these locations and by further reference to FIGS. 3 and 4, the orientation of the dish antennas 52 and the components of both polar mounts 10 may be appreciated. FIG. 3, therefore, shows the orientation of the components and the antenna dish 52 at the equator 62. The base pipe or column 14 perpendicular to the plane of the earth's surface or ground G has its latitude adjustment pipe 16 at right angles thereto. The antenna dish 52 has its directional axis 54 perpendicular to the ground when there is zero declination, and the U-bolts 48 are rotated to a position such that the axis defined by the U-bolts 48 is parallel to the axis of the latitude adjustment pipe 16.

In contrast, in FIG. 4, for polar mount 10 at the North Pole, the base pipe or column 14 which is perpendicular to the earth's surface or ground G, has its axis 28 in line with the axis 40 of the latitude adjustment pipe 16, the U-bolts 48 are positioned on the outer pipe 21 such that the axis 54 of the satellite antenna dish 52 is at maximum declination, i.e. 9 degrees, that is, corresponding to the upper location on the earth E, FIG. 2. The axis 42 passing through U-bolts 48 carrying base member 50 is inclined to the maximum as defined by the angle of inclination $\phi$ between tubes 20 and 21 defining the declination adjustment angle assembly 18, with maximum "down look" inclination of antenna dish 52.

The polar mount of the present invention is extremely simple but highly effective. If the polar mount is employed for antennas whose dishes 52 are in the one meter range, the components may be die cast of zinc or aluminum or injection molded of engineering plastic materials. As such, the assembly of tubes or pipes 14, 16, 20 and 21 is much less expensive to manufacture, must less complex to set up and orient to find the satellites. As may be appreciated, the flanges on base pipe or column 14 and latitude adjustment pipe 16 may be calibrated with markings for latitude as could the U-bolts 48 or straps or the cylindrical surface to which they are mounted be similarly marked for declination, leaving the only correction to be made, the alignment to true north.

Figures 5, 5A:
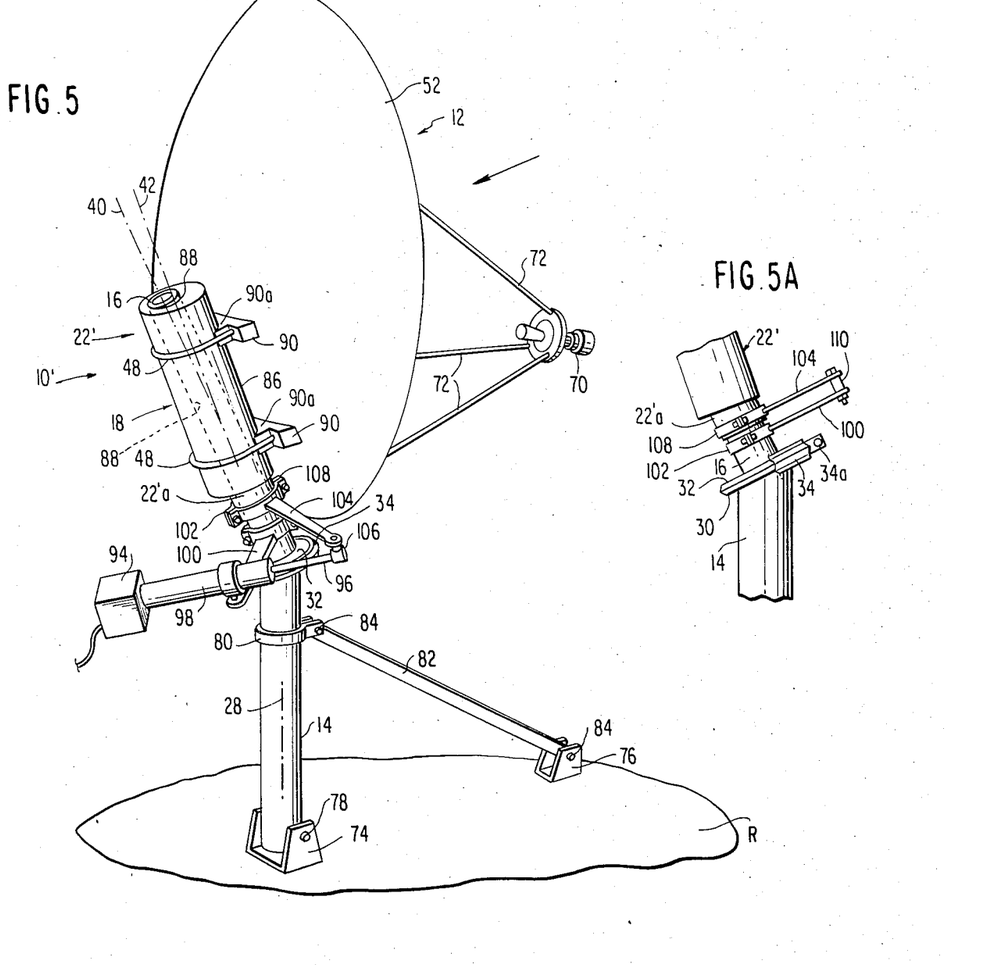
FIG. 5 is a perspective view of a second embodiment of the microwave polar antenna mount of the present invention and an antenna mounted thereby.
FIG. 5a is a vertical elevational view of a portion of the polar mount of FIG. 5 in a non-motor-driven mode with the sweep angle adjustment arms aligned and bolted together.

Referring next to the FIG. 5, there is shown in perspective view, a further embodiment of the present invention bearing an antenna mounted thereto. Like elements to the first embodiment bear like numerical designations.

The microwave antenna polar mount indicated generally at 10" again supports a dish type microwave antenna indicated generally at 12 which appropriately carries a feed horn 70 by way of multiple support rods 72, with the horn facing the concave surface of the microwave antenna dish 52. Again, insofar as polar mount 10' is concerned, it is composed principally of a base pipe or column 14, a latitude adjustment or projecting pipe 16, and a declination angle adjustment assembly indicated generally at 18. Purposely, the polar mount 10' is not mounted on the ground, but is mounted by way of brackets 74 and 76 to a roof top or the like shown at R. The base pipe or column 14 is hinge mounted by way of pin 78 at its lower end, while a collar 80 fixed to the base pipe 14 is connected by an oblique rod 82 to bracket 76, both ends of the rods being pin connected by way of pins 84. The base pipe 14 is oriented vertically, and its upper end terminates in a integral flange 30 which is at an angle to the axis 28 of base pipe 14 which is approximately 60 degrees. The latitude adjustment pipe 16 is also provided with a similar flange 32 at the same mating angle with flange 30. A Vee band clamp 34 which includes a Vee shaped inner periphery matching that of oppositely beveled cuts on flanges 30 and 32 surrounds the flanges circumferentially, and by way of adjustment screw 34a, the flanges may be locked together mechanically after rotation of latitude adjustment pipe 16 about its axis to a proper position corresponding to the latitude at which the polar mount is located.

It is in the area of the declination angle adjustment assembly 18 that the greatest difference occurs between this embodiment and the embodiment of FIG. 1. A unitary declination head 22' which may be formed of foam plastic or the like permits the adjustment of the antenna dish 52 for the declination angle required at the latitude on the earth where the polar mount supported dish 52 resides. In that respect, the declination head 22' which is of elongated cylindrical form, defines an outer cylindrical surface 86 while in foam molding the declination head, or by drilling after forming, a bore 88 is provided internally of the foam body whose axis 40 is inclined relative to the axis 42 for the cylindrical declination head 22' and the outer cylindrical surface 86 thereof.

As may be appreciated, bore 88 is of a diameter slightly larger than the outside diameter of pipe 16 which is slidably received therein so that the declination head 22' can rotate about a common axis 40 for the cylindrical outside surface 86 of the foam body declination head 22' and latitude adjustment pipe 16. The back of antenna dish 52 may have mounted thereto premolded mounting pads 90 having arms 90a which extend about the periphery of head 22'. U-bolts or clamping straps 48 permit the premolded pads 90 to move on the circumference of head 22' to preset the antenna dish 52 to a predetermined declination adjustment position in the manner of the embodiment of FIG. 1, whereupon the U-bolts or clamping straps 48 are tightened down to fixedly lock the dish 52 at a given angular position relative to the outside cylindrical surface 86 of the declination head 22'.

In order to effect a sweep or travel of the antenna dish 52 through the arc for pinpoint alignment of the dish antenna axis with a given satellite within the geostationary orbit 64, FIG. 2, in this embodiment, it is necessary to drive the declination head 22' about the axis 40 of the inclined bore 88. This is accomplished by utilization of a motorized jack indicated generally at 94 and involving an extensible and retractible push rod 96. The motorized jack has the body portion 98 pivoted to one arm 100 which in turn is clamped by means of a pipe clamp or the like 102 about the periphery of latitude adjustment pipe 16. A second arm 104 is pin connected at 106 to the outer end of rod 96 for the motorized jack, while the opposite end of arm 104 is connected by way of a pipe clamp or strap 108 to the periphery of extension portion 22'a of the declination head 22'. By extending and retracting rod 96, the antenna dish 52 is rotated about axis 40 defined by the inclined or axial offset bore 88 which extends through and is concentric to portion 22'a of head 22' and coaxial latitude adjustment pipe 16 which projects internally of that bore 88.

By reference to FIG. 5a, it may be seen that in a non-motor-driven mode, one arm 100 fixed to pipe 16 and the other 104 fixed to the declination head portion 22'a may be rigidly coupled together after alignment by a through bolt 110 locking the antenna 12 onto a given satellite within the satellite bearing arc 64' of the geosynchronous orbit 64.

Figures 6, 7, 8:
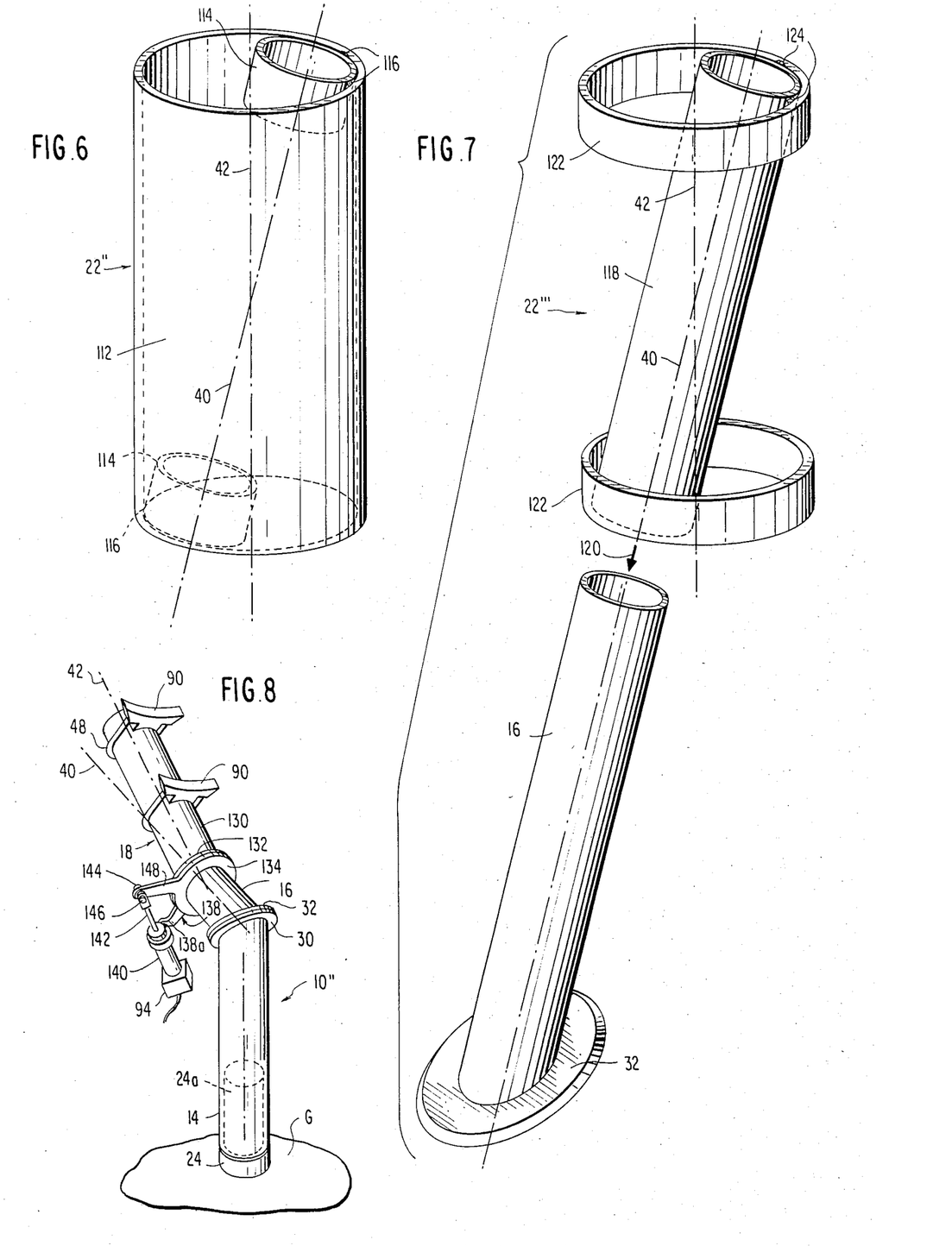
FIG. 6 is a perspective view of a modified form of declination head for the microwave polar antenna mount of the present invention.
FIG. 7 is an exploded, perspective view of a further modification of the declination head for the microwave polar antenna mount of the present invention.
FIG. 8 is a perspective view of a further embodiment of the microwave polar antenna mount of the present invention.

FIGS. 6 and 7 show alternative structures for declination heads capable of incorporation within the polar mount of the present invention.

In FIG. 6, declination head 22" comprises three elements: a relatively large diameter outer cylinder or can 112 and a pair of short length inner tubes as at 114. The inner tubes 114 have their axes aligned as at 40 but inclined with respect to the axis 42 for outer tube or can 112 and the tubes are welded together at weld points 116 such that one of the short length tubes is welded to one end of the outer tube 112 and the other short length inner tube 114 is welded to the outer tube 112 at its opposite end. In all other respects, the declination head 22" is employed in similar fashion to the declination head 22' of the embodiment of FIG. 5 and simply substitutes for that head.

Turning next to FIG. 7, a further and slightly different declination head 22''' is illustrated as being slidably mountable to the latitude adjustment pipe 16. In this case, it is comprised of a relatively long length inner tube 118 which has an internal diameter slightly larger than the outside diameter of latitude adjustment pipe 16 upon which it slidably and rotatably mounts as indicated by the arrow 120. A pair of larger diameter short length tubes 122 are welded, respectively as at 124 to the ends of the inner tube 118, with the axes 42 of the outer tube as at 42 being inclined relative to axis 40 for inner tube 18. Axis 40 is coaxial with the axis of latitude adjustment pipe 16 upon which it slidably mounts and rotates.

As may be appreciated, in the simplified illustration of the various embodiments 5 through 7 inclusive, the mechanism for rotating the declination head with respect to the latitude adjustment pipe 16' is shown as being directly coupled to a component defining the external surface of the head. It may be necessary, since the rotation occurs about the axis of pipe 16 and in common with whatever means defines the internal bore or internal surface for the declination head, that the connection be effected directly between those members alternatively there may be an extension, as for instance at 22'a in the embodiment of FIG. 5 of the molded body, about which band 108 mounts to insure proper rotation of arm 104 relative to arm 100, either manually shifted or driven by motorized jack 94, to effect movement of the antenna dish 52 through the sweep angle corresponding to the satellite bearing arc of the geosynchronous orbit 64 or to a given angular adjustment for a specific satellite.

Referring next to FIG. 8, there is shown in perspective view yet a further embodiment of the present invention in which polar mount 10" functions to support a dish type antenna (not shown) much the same as the other embodiments. Again, like elements to the other embodiments bear like numerical designations.

The polar mount 10" is composed principally of a base pipe or column 14 which is mounted for rotation upon a post 24 which projects upwardly from the ground G and which includes a reduced diameter portion 24a telescopingly received within the base pipe or column 14. A latitude adjustment pipe 16 is rotatably mounted to the base pipe 14 by means of paired flanges as at 30 and 32, on respective pipes 14, 16, in accordance with the embodiment of FIG. 1. The base pipe 14 at its upper end is cut at a diagonal as is the lower end of the latitude adjustment pipe 16 with the angles matching such that the flanges 30 and 32 are flush to each other.

The principal difference in this embodiment is the fact that an upper pipe or upper member 130 has the same type of "stove pipe" connection to the latitude adjustment pipe 16, as does base pipe 14. Further, upper pipe or cylindrical member 130 forms a principal element of declination angle adjustment assembly, indicated generally at 18. The upper pipe 130 terminates at its lower end in a diagonal cut and bears a flange at 132 which mates with a further flange 134 which is rigidly fixed to the upper end of pipe 16. Flange 134 is at right angles to the axis of pipe 16. However, the same is not true for flange 132 relative to the upper pipe 130. In accordance with the gist of the present invention, the upper pipe 130 is inclined with respect to the perpendicular to flange 132 and the axis of pipe 16 by an angle of approximately 9.2° which is the maximum declination required if in fact the polar mount were located at the North Pole. That is the highest latitude to which such apparatus could be positioned relative to the satellites within the earth's equatorial plane. The axis 40, therefore, of pipe 16 is inclined relative to the axis of upper pipe 130.

In like manner to the prior embodiment, a pair of U-bolt clamps or straps 48 permit by passing through block 90 which are directly attached to the antenna dish, to both sides of the apex of the dish antenna, the rotation of the antenna dish about axis 42 of the upper pipe 130 to a proper position circumferentially on the pipe, depending upon the latitude at which the declination adjustment must be undertaken, and subsequent clamping of the dish at an adjusted angular position thereabout.

The rotation of flange 132 relative to flange 134 and thus the dish antenna 52 and the declination angle adjustment assembly 18 about axis 40 is effected through a one piece, jack arm/bearing plate assembly in which the upper tube 130 is preferably rigidly welded to the upper face of flange 132 integral with one arm 138. The outer end 138a of that arm 138 has mounted thereto the cylinder portion 140 of a motorized jack indicated generally at 94. There is additionally, a piston rod 142 projecting outwardly of cylinder 140 and being pivotably connected by way of clevis 144 and pin 146 to a second arm 148 whose integral flange 134 is welded to the upper end of pipe 16. Arm 138 thus terminates in integral flange 132 while arm 148 terminates in integral flange 134.

There may be provided polyethylene or Teflon bearings between the bearing plates define by flanges 132, 134. Additionally, the connections between the lower base pipe 14 and the latitude adjustment pipe 16 by way of flanges 30, 32 are achieved with a V-band functioning to permit rotation but locking these components together once they have been properly rotated for relative angular positioning, one on the other.

In the illustrated embodiment of FIG. 8, the declination angle adjustment assembly defined by a can within a can or a modification thereof have been eliminated and replaced by a single somewhat smaller diameter tube or upper pipe 139 whose lower end is cut at 9.21° (with respect to the perpendicular to the axis of the upper pipe 130) for attachment to the upper of two identical rotating bearing plates 132, 134 as integral elements of jack arms 138, 148. Alternatively, a worm wheel motor drive may be built into the mid-section of the lower plate 148 to drive the upper pipe. The upper pipe 130 and latitude adjustment pipe (mid-pipe) 16 may be held together with a bolt and locking nut to adjust for tension or if made of cast materials such as thermoplastics, the two plates 132 and 134 may be designed to snap together to provide a rotating, interlocking surface.

In the embodiment of FIG. 8, it is apparent that there are actualy four joints which permit adjusting of the components of the polar mount 10". These are a first joint between post 24 and the base pipe 14. A second joint 2 exits between the base pipe 14 and the mid-pipe or latitude adjustment pipe 16. Joint three occurs between the latitude adjustment pipe 16 and declination angle adjustment pipe 130. A fourth joint is formed by U-bolts or straps 48 which surround the outer periphery of the upper pipe 130 and which permit a shift in circumferential position of the dish type antenna 12 on that pipe. In the set up procedure for this embodiment, initially the fourth joint is set for latitude declination, i.e., adjustment of the declination angle for the antenna dish 52 relative to the latitude placement of the polar mount 10". Secondly, rotation at the second joint is effected to set the latitude adjustment pipe 16 relative to the base pipe 14 for proper elevation depending upon again the latitude at which the polar mount 10" is located. The third step in the set up procedure is to set the first joint for proper azimuth by rotating the complete assembly about post 24 so that the antenna points towards the North Pole. Finally, in order to select a given satellite, the upper pipe 130 is rotated about axis 40 of the mid or latitude pipe 16, i.e., rotation of plate 132 relative to plate 134 until exact alignment occurs between the axis of the antenna dish 12 and the given satellite within the satellite orbit sector of the geosynchronous orbit. The embodiment of FIG. 8 includes, although not shown, proper locking means for locking joints 1, 2 and 3 in addition to the U-bolts or straps 48 for facilitating locking of the antenna at the proper declination angle after its movement about the periphery of the upper pipe 130.

As in prior embodiments, scale markings may be provided at respective joints to show visually the proper set up and adjustment by rotation of one element with respect to the other following the set up procedures described above.

With respect to all of the embodiments described herein, while the major elements of the stove pipe type polar mount are indicated as being cylindrical members, more specifically tubes or pipes, with or without flanges, these elements may be rectangular or otherwise in cross-section, it being only important that they have oblique or other abutting faces and that they are mounted for rotation about their axes to effect the desired adjustment and set up via the procedures described herin.

While the invention has been particularly shown and described with reference to a preferred embodiment thereof, it will be understood by those skilled in the art that varous changes in form and details may be made therein without departing from the spirit and scope of the invention.

I claim:

1. A polar mount apparatus for aligning a microwave directional antenna axis at a given site on the earth with a given satellite or a series of satellite within the earth's equatorial geosynchronous orbit track sector defining an equitorial plane, said apparatus comprising:

a directional antenna, a cylindrical base member mounted for rotation about a vertical axis on the earth site and being cut at a diagonal at its upper end, a cylindrical latitude adjustment member cut at one end at a diagonal, matching that of said base member, means for rotatably mounting the cut ends of said members, end-to-end and for fixing said members after rotation such that said members rotate in the plane of the cuts tending between axial in line and right angle postions, means for mounting said antenna to said latitude adjustment member for rotation about the axis of the latitude adjustment member and for fixing said antenna after rotation, and said antenna mounting means comprises a declination angle adjustment head assembly carried by said cylindrical latitude adjustment member comprising means for adjusting the inclination of the axis of the antenna relative to the axis of the latitude adjustment member and for fixing the antenna axis at that inclination to a degree of declination necessary to compensate for the location of said polar mount apparatus on said earth site from said equatorial plane;

whereby, aligning is achieved by a series of steps comprising; rotating said latitude adjustment member on said base member to a position corresponding to the earth's latitude location and locking of said members together, rotating said cylindrical base member to align the axis of said latitude adjustment member to a position where said latitude adjustment member points to the north star and fixing it thereat, adjusting the position of the antenna on said latitude adjustment member to compensate for the declination angle relative to said equatorial plane at that latitude, and rotating said antenna about the axis of the latitude adjustment member until the directive antenna points to said given satellite within said sector.

2. The apparatus as claimed in claim 1, wherein said cylindrical base member and said cylindrical latitude adjustment member comprise hollow tubes terminating in radially outwardly directed flanges at 45 degrees to the axes of the members and means for selectively locking the flanges together after rotation of one member with respect to the other to the proper angular position for the latitude of the earth's location for said apparatus.

3. The apparatus as claimed in claim 1, wherein said means for adjustably fixing the inclination of the directional axes of said antenna relative to said latitude adjustment member comprises; an inner tube slidably mounted on the outside of said cylindrical latitude adjustment member for rotation about the axis of said latitude adjustment member, an outer tube fixedly mounted to the inner tube with their axes defining therebetween an acute angle equal to the maximum declination adjustment angle for said polar mount apparatus, and means for mounting said antenna on said outer tube for rotation about the periphery of said outer tube and for adjustably fixing said antenna on the outer tube at a variable circumferential position on said outer tube to adjust said antenna for the declination angle at the latitude at which the polar mount apparatus is positioned.

4. The apparatus as claimed in claim 3, wherein U-bolt means surround said outer tube to adjustably fix said antenna to said outer tube and to permit said antenna to be rotated about the axis of said outer tube to provide for declination adjustment corresponding to that needed for said site.

5. The apparatus as claimed in claim 3, wherein said antenna comprises a dish antenna, a planar base member is fixedly mounted to the outside of said dish antenna, at its apex, and paired U-bolts surrounding said outer tube at spaced locations which terminate in threaded ends projecting through said planar base member, and nuts are carried by the threaded ends of said U-bolts; whereby, loosening said nuts permits said antenna, said planar base member and said U-bolts to be rotated about the axis of said outer tube to permit adjustment of the position of said antenna relative to said outer tube in conformance with the declination adjustment necessary to the antenna for the site location at which the polar mount apparatus is positioned relative to the earth.

6. The apparatus as claimed in claim 3, wherein said inner tube has an inner diameter slightly larger than the outer diameter of said cylindrical latitude adjustment member, said outer tube is of a considerably larger diameter than the inner tube, and is welded to said inner tube at least one end thereof to fix the maximum declination adjustment angle between said tubes, and wherein a plurality of circumferentially spaced, longitudinally extending slots are provided within one end of said inner tube, and wherein a hose clamp surrounds said inner tube at the location of said slots such that closing down the hose clamp frictionally locks the inner tube onto said cylindrical latitude adjustment member at a given angular position, after said antenna has been rotated about the axis of said latitude adjustment member by rotation of said inner tube with the antenna pointing to a given satellite.

7. The apparatus as claimed in claim 2, wherein a vertically upstanding fixedly mounted post receives the end of said cylindrical base member remote from said flanged end, and wherein set screws carried by said cylindrical base member have ends which contact the periphery of said post to lock said cylindrical base member at a position where said cylindrical latitude adjustment member points to the north star.

8. The apparatus as claimed in claim 1, wherein said means for adjustably fixing the inclination of the axis of the antenna relative to the axis of the latitude adjustment member to the degree of declination necessary to compensate for the site location of the polar mount apparatus on the earth from said equatorial plane, comprises said declination angle adjustment head assembly having an internal cylindrical surface sized to and slidably, rotatably receiving the cylindrical latitude adjustment member and having an external cylindrical surface whose axis is at an acute angle to the axis of said internal cylindrical surface equal to the maximum declination adjustment angle for said polar mount apparatus, and means for adjustably rotating said antenna about said external cylindrical surface and fixing said antenna at a given circumferential position on said external cylindrical surface corresponding to the declination angle at the latitude of the site at which the polar mount apparatus is positioned.

9. The apparatus as claimed in claim 1, wherein said means for adjustably fixing the inclination of the axis of the antenna relative to the axis of the latitude adjustment member comprises an outer tube and a pair of short length inner tubes axially aligned with respect to each other and being welded to said outer tube internally thereof at respective ends with the internal diameter of said short length inner tubes being sized to and receiving said latitude adjustment member and means for mounting said antenna on said outer tube for rotation about the periphery of said outer tube and for adjustably fixing the antenna on the outer tube at a given circumferential position with respect to the outer tube corresponding to the declination angle at the latitude at which the polar mount apparatus is positioned.

10. The apparatus as claimed in claim 1, wherein said declination angle adjustment head assembly comprises an inner tube having an inner diameter slightly larger than the outer diameter of said latitude adjustment member and being slidably and rotatably mounted thereon, and a pair of short length outer tubes welded to respective ends of said inner tube and having their axes aligned but inclined relative to the axis of the inner tube to define therebetween an acute angle equal to the maximum declination adjustment angle for said polar mount apparatus, and means for mounting said antenna for rotation about the periphery of said outer tubes and for adjustably fixing said antenna on said outer tubes at a given circumferential position thereon corresponding to the declination angle at the latitude at which said polar mount apparatus is positioned.

11. The apparatus as claimed in claim 8, wherein said declination angle adjustment head assembly comprises a unitary, solid cylindrical member having an internal bore defining said internal cylindrical surface, inclined to the axis of the cylindrical unitary solid cylindrical member external cylindrical surface with said bore slidably and rotatably receiving said latitude adjustment member.

12. The apparatus as claimed in claim 11, wherein said unitary solid cylindrical member comprises a foam plastic cylinder.

13. The apparatus as claimed in claim 1, wherein said declination angle adjustment head assembly comprises an upper pipe, means for mounting said antenna for rotation about the periphery of said upper pipe and for adjustably fixing the antenna on the upper pipe at a given circumferential position thereon corresponding to the declination angle at the latitude at which the polar mount apparatus is positioned, said upper pipe having a lower end cut at a diagonal which is at an angle relative to the perpendicular to the axis of said upper pipe equal to the maximum declination adjustment angle for the polar mount apparatus, and wherein said upper pipe lower end is in operative rotational abutment with the end of the cylindrical latitude adjustment member remote from the end of that member in contact with the cylindrical base member, with that end of said cylindrical latitude adjustment member cut perpendicular to its axis, and means for adjustably locking said upper pipe to said cylindrical latitude adjustment member after rotation of said upper pipe relative to said cylindrical latitude adjustment member about the axis of the cylindrical latitude adjustment member to the extent where the directive antenna points to said given satellite within said sector.

* * * * *